United States Patent [19]

Moulton et al.

[11] Patent Number: 5,612,153

[45] Date of Patent: Mar. 18, 1997

[54] BATTERY MASK FROM RADIATION CURABLE AND THERMOPLASTIC MATERIALS

[75] Inventors: Russell D. Moulton, San Jose, Calif.; Ib I. Olsen, Henderson, Nev.

[73] Assignee: Valence Technology, Inc., Henderson, Nev.

[21] Appl. No.: 422,209

[22] Filed: Apr. 13, 1995

[51] Int. Cl.⁶ .................................................. H01M 10/36
[52] U.S. Cl. ........................ 429/191; 429/126; 429/162
[58] Field of Search ............................... 429/191, 216, 429/153, 254, 126, 162

[56] References Cited

U.S. PATENT DOCUMENTS

| | | | |
|---|---|---|---|
| 2,690,465 | 9/1954 | Broder | 429/191 |
| 4,430,397 | 2/1984 | Untereker | 429/191 |
| 4,925,751 | 5/1990 | Shackle et al. | 429/191 |

*Primary Examiner*—John S. Maples
*Attorney, Agent, or Firm*—Charles Jew

[57] ABSTRACT

A secondary, solid electrolytic battery includes a number of electrically connected electrolytic cells wherein for each cell the anode and cathode are separated from each other by a mask that is a layer of electrically insulative material that is coated along the perimeter of the anode and/or cathode. The mask reduces the rate of dendrite formation and prevents edge-effects, short circuits, and related problems caused by inadvertent contact of the anode and cathode.

31 Claims, 2 Drawing Sheets

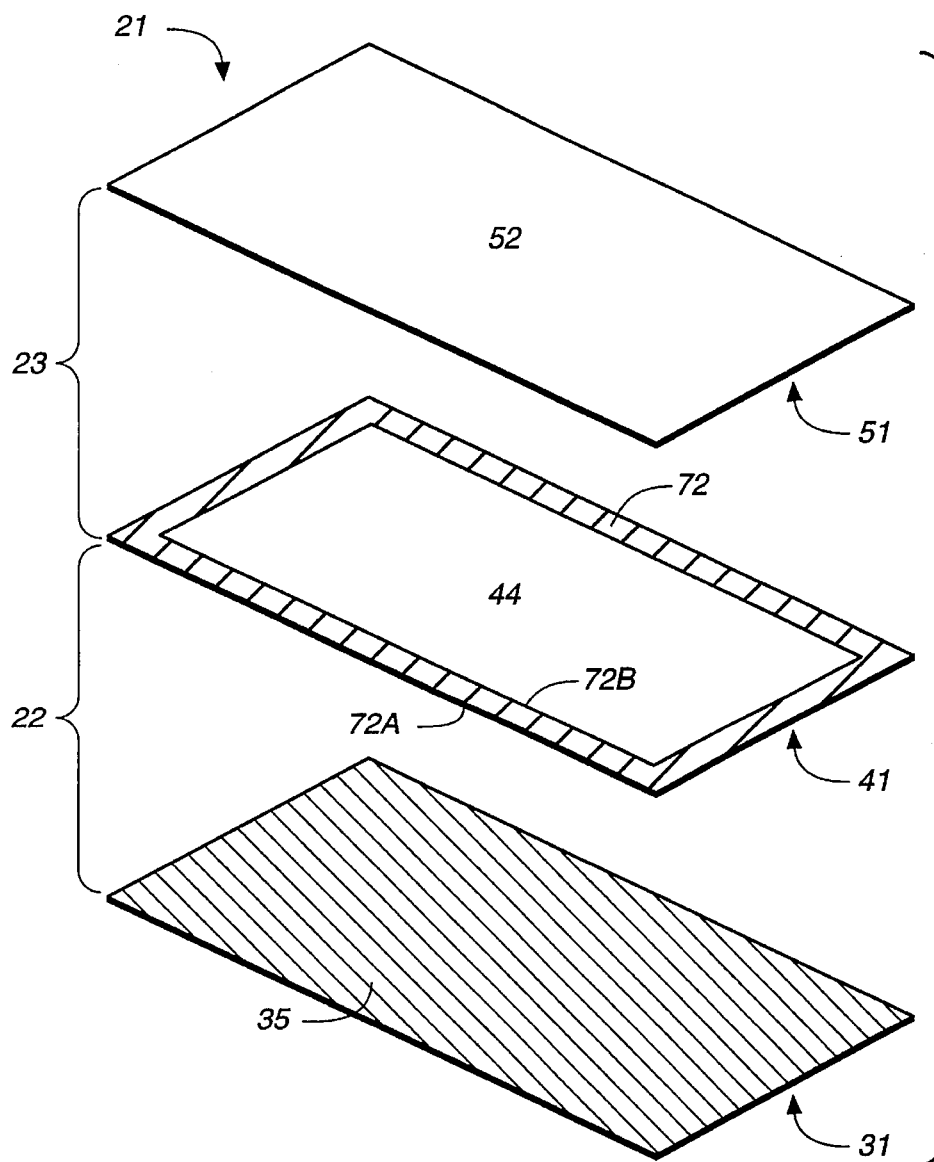
FIG._1
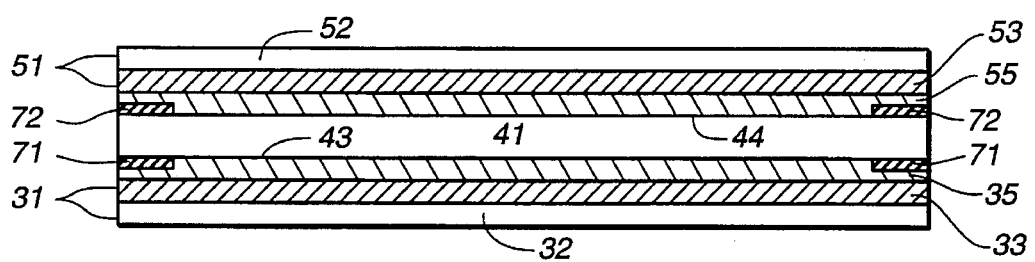
FIG._2

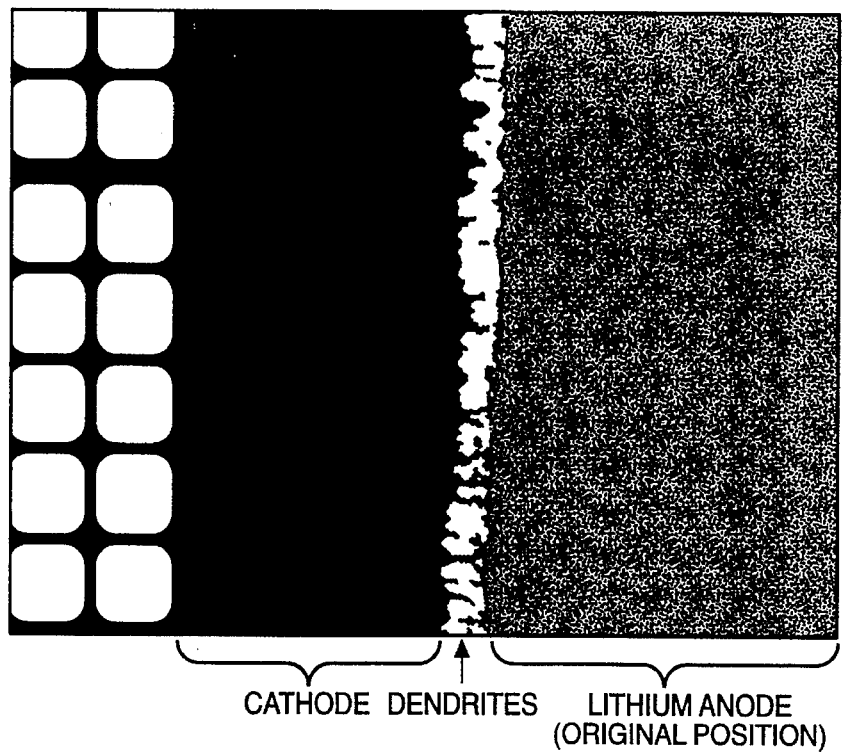

FIG._3

CATHODE  DENDRITES  LITHIUM ANODE
(ORIGINAL POSITION)

Example of minor dendrite formation on the anode edge growing towards the cathode edge. The squares to the left are 1 mm on each side.

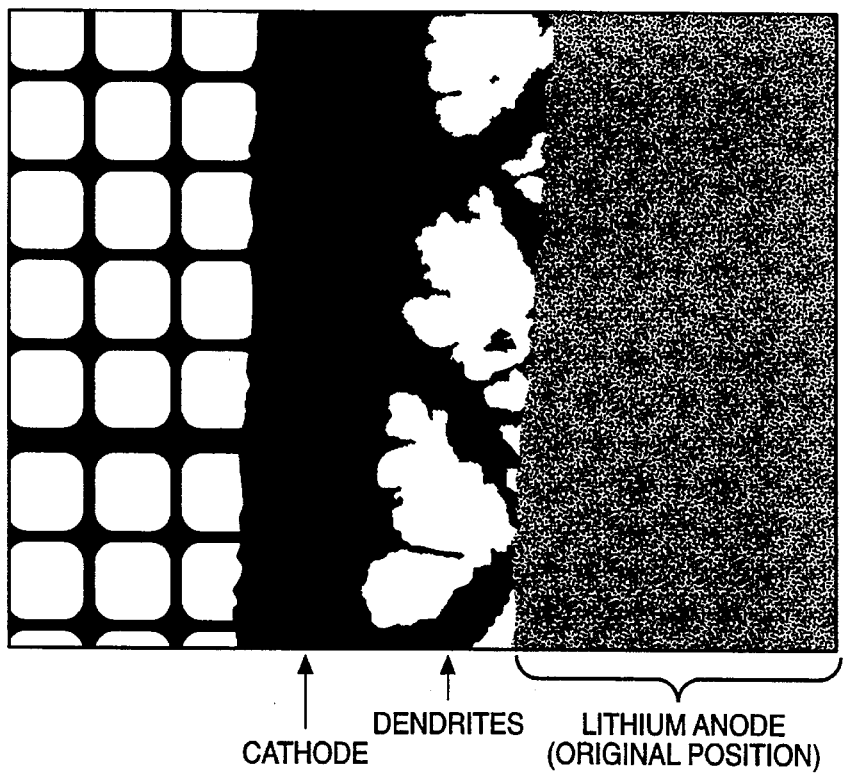

FIG._4

CATHODE  DENDRITES  LITHIUM ANODE
(ORIGINAL POSITION)

Example of severe dendrite formation on the anode edge growing towards the cathode edge. The squares to the left are 1 mm on each side.

5,612,153

BATTERY MASK FROM RADIATION CURABLE AND THERMOPLASTIC MATERIALS

FIELD OF THE INVENTION

The present invention relates to secondary electrolytic cells and batteries and, more particularly, to solid secondary electrolytic cells having a mask interposed between the anode and cathode that is made from radiation curable or thermoplastic materials.

STATE OF THE ART

Electrolytic cells comprising an anode, a cathode and a solid, solvent-containing electrolyte are known in the art and are usually referred to as "solid electrolytic cells." One class of solid electrolytic cells are rechargeable (secondary) lithium cells which comprise a solid electrolyte interposed between an anode comprising lithium and a composite cathode which comprises materials suitable for recycling (recharging) the cell after discharge.

Batteries having solid electrolytic cells have gained prominence in recent years. The advantages of solid electrolytic batteries include lower battery weight than batteries that employ liquid electrolytes, longer service life, relatively high power densities, relatively high specific energies, and the elimination of acidic liquid electrolytes. Solid electrolytic batteries typically have a thin polymer electrolyte and sheet-like anode and cathode layers; a battery commonly has a plurality of individual electrolytic cells.

In fabricating secondary, solid electrolytic batteries, after the current collector, cathode composite, electrolyte composition and anode have been assembled, electrodes are attached to the anode and current collector. The assembly is then inserted into an air and water impermeable protective material and the edges of the protective material are sealed, preferably by heat sealing around edges of the cell components. Sealing occurs under vacuum conditions to enable the protective material to form a tightly adherent seal around the component layers and electrodes such that the only external access to the component layers is via the electrodes. See, for instance, Shackle, et al., U.S. Pat. No. , 4,925,751. Examples of heat sealable gas and water impermeable protective materials include a multi-layered material having an interior heat sealable layer comprising ethylene acrylic acid, an intermediate barrier layer comprising aluminum foil, and an exterior layer of polyethylene terephthalate. Despite these precautions, existing solid electrolytic batteries, however, often tend to exhibit "edge-effects" whereby the anode and cathode of an electrolytic cell come into electric contact thus causing short circuits. In addition, dendrite growth around the perimeter of the solid electrolyte also reduces battery life.

SUMMARY OF THE INVENTION

The present invention is directed, in part, to the use of radiation curable materials to form an electrically insulative layer or mask between the anode and cathode of a solid electrolytic cell to effectively eliminate edge-effects. The radiation curable materials can be sprayed or stenciled onto the layer of solid electrolyte before being cured. The mask so fabricated can have intricate patterns with practically no waste of starting materials. Alternatively, the mask can be coated on the anode or cathode. Masks can also be formed from thermoplastic materials. The invention improves the service life of solid secondary electrolytic cells and batteries.

Accordingly, in one of its composition aspect, the invention is directed to a solid, secondary electrolytic cell which comprises:

an anode;

a cathode;

a solid electrolyte functionally disposed between said anode and said cathode; and a mask comprising an insulative layer that is coated on a surface along the perimeter of said anode, cathode, or solid electrolyte, wherein the mask is fabricated by a process comprising:

(i) depositing a liquid radiation curable material onto said surface; and (ii) curing said radiation curable material.

In another composition aspect, the invention is directed to a secondary electrolytic cell which comprises:

an anode;

a cathode;

a solid electrolyte functionally disposed between said anode and said cathode; and a mask comprising an insulative layer that is coated on a surface along the perimeter of said solid anode, cathode, or solid electrolyte, wherein the mask is fabricated by a process comprising:

(i) depositing a melted thermoplastic material onto said surface; and (ii) allowing the thermoplastic material to cool.

In one of its method aspects, the invention is directed to a method of fabricating an electrochemical device comprising an anode, a cathode, and a solid electrolyte interposed between the anode and cathode, said method comprising the steps of:

depositing a radiation curable material on a surface along the perimeter of the anode, cathode, or solid electrolytes;

curing said radiation curable material to form a mask that is substantially impermeable to electrolytic solvents and salts; and forming said electrochemical device by applying said anode and cathode to opposite sides of said solid electrolyte.

In a preferred embodiment, the radiation curable material is sprayed, painted, or printed onto the surface of the anode, cathode or solid electrolyte.

In a further aspect, the invention is directed to a method of fabricating an electrochemical device comprising an anode, a cathode, and a solid electrolyte interposed between the anode and cathode, said method comprising the steps of:

applying a melted thermoplastic material on a surface along the perimeter of the anode, cathode, or solid electrolyte;

allowing the thermoplastic material to cool to form a mask that is substantially impermeable to electrolytic solvents and salts; and forming said electrochemical device by applying said anode and cathode to opposite sides of said solid electrolyte.

BRIEF DESCRIPTION OF THE DRAWINGS

FIG. 1 is a schematic, exploded perspective view of a multi-cell battery.

FIG. 2 is a schematic, side cross-sectional view of a multi-cell battery.

FIGS. 3 and 4 are renditions showing dendrite formation in an electrolytic cell.

DESCRIPTION OF THE PREFERRED EMBODIMENT

As noted above, this invention is directed to methods for extending the service life of solid, secondary electrolytic cells. However, prior to discussing this invention is further detail, the following terms will first be defined.

Definitions

As used herein, the following terms have the following meanings.

The term "solid, secondary electrolytic cell" or "solid, secondary electrochemical cells" refers to a composite electrolytic cell comprising an anode, a solid, solvent-containing electrolyte and a cathode comprising a cathodic material capable of repeated discharge/charge cycles so as to permit repeated reuse wherein the electrolyte is interposed between the anode and the cathode. The solid, solvent-containing electrolyte comprises an electrolytic solvent, a salt, and a solid polymeric matrix.

The term "battery" refers to two or more electrochemical cells electrically interconnected in an appropriate series/parallel arrangement to provide the required operating voltage and current levels.

The term "compatible electrolyte solvent" or "electrolytic solvent," or in the context of components of the solid electrolyte, just "solvent," is a low molecular weight organic plasticizer added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as propylene carbonate, ethylene carbonate, gamma-butyrolactone, glyme, diglyme, triglyme, tetraglyme, dimethylsulfoxide, dioxolane, sulfolane, and the like. A particularly preferred solvent is disclosed in U.S. Pat. No. 5,262,253, which is incorporated herein.

The term "salt" refers to any salt, for example, an inorganic salt, which is suitable for use in a solid electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)2^-$, and the like. Specific examples of suitable inorganic ion salts include $LiClO_4$, $LiSCN$, $LiBF_4$, $LiAsF_6$, $Li[N(SO_2CF_3)_2]$, $LiCF_3SO_3$, $LiPF_6$, $NaSCN$, and the like. The inorganic ion salt preferably contains at least one atom selected from the group consisting of Li, Na and K.

The term "solid polymeric matrix" or "solid matrix" refers to an electrolyte and/or composite electrode compatible material formed by polymerizing an inorganic or organic monomer (or partial polymers thereof) and which, when used in combination with the other components of the electrolyte or the composite electrode, renders the electrolyte or composite electrode solid. The solid matrix may or may not be ion-conducting. Preferably, however, the solid matrix is capable of ionically conducting inorganic cations (e.g., alkali ions as defined above). When employed to form the electrolyte or the composite electrode, the solid matrix forming monomer is preferably polymerized in the presence of the alkali salt and the electrolytic solvent to form solid matrices which are suitable for use as solid electrolytes or composite electrodes in electrolytic cells.

Suitable solid polymeric matrices are well known in the art and include solid matrices formed from inorganic polymers, organic polymers or a mixture of polymers with inorganic non-polymeric materials. Preferably, the solid polymeric matrix is an organic matrix derived from a solid matrix forming monomer and from partial polymers of a solid matrix forming monomers. Alternatively, the solid polymeric matrix can be used in combination with a non-polymeric inorganic matrix. See, for example, U.S. Pat. No. 4,990,413 which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monomer" refers to inorganic or organic materials which in monomeric form can be polymerized to form solid polymeric matrices. Suitable solid matrix forming monomers are well known in the art and the particular monomer employed is not critical. Preferably, the solid matrix forming monomers contain heteroatom functionalities capable of forming donor acceptor bonds with the cations of the alkali salt so as to render the solid matrix ion-conducting (i.e., able to conduct the alkali cations). Ion-conducting heteroatom functionalities in solid polymeric matrices include, by way of example, ether groups, secondary and tertiary amine groups, and the like. On the other hand, non ion conductive solid matrix forming monomers can also be used herein including, by way of example, monomers not containing heteroatoms, and monomers containing non-conductive hetero- atom functionalities such as carboxylic acid groups, sulfonic acid groups, and the like. The latter are non-conductive because they strongly bind the alkali cation.

Examples of suitable solid matrix forming monomers include, by way of example, ethyleneimine, ethylene oxide, epichlorohydrine, acryloyl-derivatized polyalkylene oxides (as disclosed in U.S. Pat. No. 4,908,283, which is incorporated herein) urethane acrylate, trimethyl propyl-triacrylate, ethylene propylene diene monomer, vinyl sulfonate polyalkylene oxides (as disclosed in U.S. Pat. No. 5,262,253 which is incorporated herein), acrylic acid, chloroacrylic acid, bromoacrylic acrylic acid, crotonic acid, propylene, ethylene and the like as well as mixtures thereof.

Examples of suitable inorganic solid matrix forming monomers include, by way of example, phosphazines and siloxanes. Phosphazine monomers and the resulting polyphosphazine solid matrix are disclosed by Abraham et at., Proc. Int. Power Sources Syrup., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized to form solid polymeric matrices.

The term "prepolymer" refers to solid matrix forming monomers and/or partial polymers thereof.

The term "cured" or "cured product" refers to the treatment of prepolymers under polymerization conditions so as to form a solid polymeric matrix. The resulting cured product can include cross-linking between polymer backbones. Suitable polymerization conditions are well known in the art and include by way of example, heating the monomer, irradiating the monomer with UV light, electron beams, and the like. Examples of cured products, that is, solid polymeric matrices, suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the salt and the electrolytic solvent. For example, a composition comprising requisite amounts of the solid matrix forming monomer, salt and electrolytic solvent can be applied to a substrate and then cured. Alternatively, the solid matrix forming monomer can be first cured and then dissolved into a suitable volatile solvent. Requisite amounts of the salt and electrolytic solvent can then be added. The mixture is then placed on a substrate and removal of the volatile solvent results in formation of a solid electrolyte. In either case, the resulting solid electrolyte is a homogeneous, single phase product which is maintained upon curing or evaporation, and does not readily separate upon cooling to temperatures below room temperature. Accordingly, the solid electrolyte of this invention does not include a separator as is typical of liquid electrolytes.

The anode is typically comprised of a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Particularly preferred anodes include lithium intercalation anodes employing carbon materials such as graphite, cokes, mesocarbons, and the like. Such carbon intercalation based anodes typically include a polymeric binder suitable for forming a bound porous composite having a molecular weight of from about 1,000 to 5,000,000. Examples of suitable polymeric binders include EPDM (ethylene propylene diene terpolymer), PVDF (polyvinylidene difluoride), EAA (ethylene acrylic acid copolymer), EVA (ethylene vinyl acetate copolymer), EAA/EVA copolymers, and the like. The anode also may include an electron conducting material such as carbon black.

The cathode is typically comprised of a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$, lithiated manganese oxides, e.g., $LiMn_2O_4$, lithiated nickel oxides, e.g., $LiNiO_2$, and the like.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000. Examples of suitable polymeric binders include EPDM (ethylene propylene diene terpolymer), PVDF (polyvinylidene difluoride), EAA (ethylene acrylic acid copolymer), EVA (ethylene vinyl acetate copolymer), EAA/EVA copolymers, and the like.

The term "battery mask" or "mask" refers to electrically insulative material, derived from radiation curable materials, that frames the edges and corners of the anode and/or cathode of an electrolytic cell so as to prevent inadvertent contact of the anode and cathode. Alternatively, the mask can be derived from thermoplastic materials that are first applied on the anode, cathode, and/or solid electrolyte by extrusion or other techniques known in the art and thereafter allowed to cool. The mask(s) can be formed directly on the anode and/or cathode surface, alternatively, the mask can be formed on the solid electrolyte surface that is in contact with the anode or cathode surface. The mask preferably covers the entire perimeter of the anode and/or cathode surface. However, it is understood that forming a mask on the "perimeter" of the anode, cathode or solid electrolyte surface also encompasses embodiments wherein only a portion of the entire perimeter is covered by the mask.

The term "radiation curable material" refers to suitable substances that upon curing forms an electrically insulative layer. Preferably, the radiation curable material is a mask forming monomer, partial polymers of a mask forming monomer, or mixtures thereof in liquid form so that the radiation curable material can be readily coated onto the anode, cathode and/or solid electrolyte surface. In a preferred embodiment the monomers or oligomers employed to make the mask do not incorporate heteroatoms capable of solvating the salts in the electrolyte solvent.

The term "a mask forming monomer" refers to inorganic or organic materials which in monomeric (or oligomeric) form can be polymerized to form electrically insulative layers with the requisite mechanical properties for use in an electrochemical device. The mask forming monomer should form polymers and/or copolymers that are compatible with the electrode and electrolyte materials, but it must have physical and chemical properties different from that of the solid polymeric matrix in order to render the mask substantially impermeable to electrolytic solvents and salts. More preferably, the mask is essentially impermeable to the electrolytic solvents and salts. Preferably, the mask forming monomer can be readily applied to a surface of the anode, cathode, or solid solvent-containing electrolyte prior to being cured. A preferred class of monomers is selected from acrylates that form, for instance, polypropylene di- and tri-acrylate, polyethylene di- and tri-acrylate, urethane di- and tri-acrylate, epoxy mono di- and tri-acrylate, isobornyl acrylate or mixtures thereof, and polyester-based di- and tri-acrylates. (The acrylate group can be substituted with a vinyl or a methacrylate group.) The formulation which is applied onto the electrodes to form the mask may include, in addition to the monomer or oligomer, a photoinitiator such as 2-hydroxy-2-methyl-1-phenyl-propane-1-one as well as benzophenone. Generally, any of the polymers which can serve as a photoresist material for circuit boards and scratch free coatings is suitable. It will be readily appreciated by persons skilled in the art that the photoinitiator component is essential where ultraviolet light is employed to cross-link the monomeric or oligomeric component whereas its use is not necessary when employing electron beam radiation.

Mask forming monomers can also comprise cycloaliphatic epoxides that are, for instance, cationic activated. Cycloaliphatic epoxides are described, for instance, in U.S. Pat. No. 5,006,431, which is incorporated herein.

The monomer or oligomer formulation is applied onto the anode, cathode and/or electrolyte by conventional techniques to form a layer between about 1 and 25 μm thick, more preferably about 1–15 μm, and most preferably about 5 μm. Then, the layer of monomer or oligomer is cross-linked using ultraviolet light, electron beams or heat to form a masking layer having a thickness between about 1 and 25 μm thick, more preferably about 1–15 μm, and most preferably about 5 μm. The anode or cathode including the masking layer is then assembled into a solid electrolytic device by applying such layers with a solid polymeric electrolyte. As is apparent, the thickness of the mask depends on the thickness of the anode, cathode, and solid solvent-containing electrolyte of the electrochemical and mask thickness may therefore exceed 25 μm. Preferably, the mask thickness should be approximately 1 to 12% of the total thickness of a solid, secondary electrochemical cell that comprises an anode, cathode, electrolyte and mask.

Cross-linking is achieved using actinic radiation which includes the entire electromagnetic spectrum and electron beam and gamma radiation. Based, however, on the availability of radiation sources and simplicity of equipment, electron beam and ultraviolet radiation will be used most often. Electron beam and gamma radiation are advantageous because they do not require the presence of a photoinitiator. When using electron beam, the beam potential must be sufficiently high to penetrate the electrode layer, the anode or cathode half element, or the cell itself depending upon which manufacturing technique is adopted. Voltages of 175 to 300 kV are generally useful. The beam dosage and the speed with which the element traverses the beam are adjusted to control the degree of cross-linking in an otherwise known manner.

The term "a partial polymer of a mask forming monomer" refers to mask forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized to form masks.

The term "mask prepolymer" refers to mask forming monomers and/or partial polymers thereof.

The term "cured", with respect to masks, refers to treatment of mask prepolymers under polymerization conditions so as to form a mask. The resulting mask can include cross-linking between polymer backbones.

The term "thermoplastic material" refers to suitable organic polymers that can be made to soften and take on new shape by the application of heat or pressure and that upon cooling forms an electrically insulative layer. The thermoplastic material should be compatible with the electrode and electrolyte materials, but it must have physical and chemical properties different from that of the solid polymeric matrix in order to render the mask at least substantially impermeable to electrolyte solvents and salts. More preferably, the mask is essentially impermeable to electrolyte solvents and salts. Suitable thermoplastics that can be used for masks, include, linear and branched polymers such as polyesters, polyethylene terephthalate, polyethylene, polypropylene, polystyrene, ethylene-vinyl acetate copolymer and other suitable olefin-based polymers and copolymers.

The term "cycle life" refers to the number of discharge/charge cycles which can be conducted on an electrolytic cell before that cell is no longer able to maintain a capacity in the charged state equal to at least 50% of its charged capacity after fabrication.

METHODOLOGY

With reference to FIGS. 1 and 2, a multi-cell battery 21 includes a first cathode 31, an anode 41, and a second cathode 51. Solid electrolyte 35 is interposed between cathode 31 and anode 41. Similarly, solid electrolyte 55 is interposed between cathode 51 and anode 41. The first cathode 31, solid electrode 35, and anode 41 form a first electrolytic cell 22. The second cathode 51, solid electrolyte 55, and anode 41 form a second electrolytic cell 23. The first and second electrolytic cells thus form a "multi-cell" battery. As further described below, cathode 31 includes current collector 32 and cathodic material 33. Cathode 51 includes current collector 52 and cathodic material 53.

In a preferred embodiment, the multi-cell battery 21 includes two electrolytic cells 22, 23 and is referred to as a "bicell" battery. For the remainder of this description, the multi-cell battery 21 will be referred to as a bicell battery in accordance with the preferred embodiment. However, it is understood that any number of electrolytic cells 22, 23 may be positioned on top of one another, that is stacked together, in the manner described herein to form a battery. Furthermore, as an alternative structure for constructing a bicell battery, the middle electrode could be the cathode and the other two electrodes being the anodes.

Anodes for the present invention can be manufactured from any suitable material; however, the invention is illustrated herein employing electrolytic cells having lithium anodes and corresponding cathodes that are capable of intercalating lithium cations.

In forming the first and second cathodes 31, 51, a layer of cathodic material 33, 53 in paste form is applied in a predetermined thickness onto the surfaces of current collectors 32, 52, respectively. Each current collector is preferably formed from a web or sheet of conductive material. In a presently preferred embodiment, the current collectors are formed from aluminum, nickel, or copper. Thereafter, solid electrolytes 35, 55 are formed, each in a layer of a predetermined thickness, onto the layers of cathodic material 33, 53, respectively. The solid electrolyte is formed from a polymeric electrolyte solution. The width and length of the rectangularly shaped anode and first and second cathodes should be substantially the same so that their edges are flush as shown in FIG. 2.

To prevent edge effects, short-circuits, and related problems that are caused by inadvertent contact of the anode 41 with the first and second cathodes 31 and 51, masks 71 and 72 are formed on the perimeter of surfaces 43 and 44, respectively of the anode. Each mask is preferably formed on an electrode (anode or cathode) but the mask can be formed on the surfaces of the solid electrolyte.

Mask 72 is formed by depositing a radiation curable material onto the perimeter of surface 44 of anode 41 and curing said material. The radiation curable material can be deposited by spraying (e.g., ultrasonic), extrusion, painting, printing, or any other conventional techniques. (Alternatively, the mask can be formed using solvated polymers which would eliminate the need for radiation curing or thermoplastic phase transitions.) Masks having different patterns can be formed with the use of stencils. The mask effectively covers the edges and corners along the perimeter of the anode. This mask configuration still allows for substantial contact between the surface of the solid electrolyte 55 and the anode surface 44. The amount of curable material used should be sufficient to form a mask effective to cover the edges and corners of the anode but excessive amounts are to be avoided so that the mask formed does not significantly interfere with cation conduction between the anode and first cathode through said layer of solid electrolyte. (As is apparent, the mask could have been formed on cathode 51 in addition to, or instead of, being formed on the anode. The mask would cover the edges and corners of the cathode.) The mask should be quite thin so as to cause only insignificant surface distortions of the solid electrolyte 55 when anode surface 44 contacts the solid electrolyte. The mask formed should have a depth on each side that is about 0.5 to 10% and preferably 2–5% of the anode or cathode or solid electrolyte surface dimensions. In other words, for instance, the distance from the outer to inner edges of the mask (designated as positions 72A and 72B in FIG. 1.) should be equal to approximately 0.5 to 10% (and preferably 2–5%) of the width of anode 41.

Insulative layer 71 is formed on surface 43 of anode 41 in a manner similar to that of forming layer 72.

After the electrolytic cells have been assembled, the anode is connected to a first electrode that is commonly designated the negative electrode (or terminal) of the battery, and the first and second cathodes are connected to a second electrode that is commonly designated to the positive electrode (or terminal). Thereafter, the cell is sealed with a protective material that is impermeable to moisture and air.

In the embodiment as shown in FIGS. 1 and 2, the masks were formed on the anode surfaces. However, for each electrolytic cell, 22 or 23, the mask can be formed directly on the anode, cathode, and/or solid electrolyte. Indeed, the mask can be incorporated along the perimeter of any surface of any layer of material that is situated between the anode and cathode.

As shown in FIG. 2, electrolytic cells may be fabricated using an anode having the same length and width as that of the cathode so that their edges are flushed. (The length and width of the solid electrolyte are the same as those of the cathode.) It is understood that the mask can be employed regardless of the relative configurations and dimensions of the anode, cathode, and solid electrolyte. However, when the anode and cathode have the same lengths and widths, burrs, i.e., sharp edges, on the current collector can cause short circuits if they pierce through the solid electrolyte especially along the perimeter of the electrolytic cell. Therefore, electrolytic cells are often constructed wherein the dimensions of the anode are less than those of the cathode and electrolyte. But given that the total anodic current must equal the total cathodic capacity, the smaller anode operates at a higher current density than the larger cathode; the result is that dendrite formation, upon repeated discharge/charge cycles, tends to proliferate from the edges of the anode.

FIGS. 3 and 4 are renditions showing dendrite formation in conventional electrolytic cells. (The length and width of the anode are smaller than those of the cathode.) For each electrochemical cell, the cathode was prepared from a cathode paste that comprised: $V_6O_{13}$ (53%), carbon (3.7%), 4:1 propylene carbonate/triglyme (31.9%), polyethylene oxide (2%), polyethylene glycol diacrylate (8%), and ethoxylated trimethylolpropane triacrylate (1.4%). The electrolyte mixture, on a weight basis, prior to curing comprised: propylene carbonate (60.19%), triglyme (15.05%), urethane acrylate (11.93%), $LiPF_6$ (9.83%) and PEO film forming agent (3%). The anode comprised a sheet of lithium foil.

The renditions are based on photographs that were taken after the anode was removed; the cathode is not visible in the photographs since it is covered by the solid electrolyte. As shown in FIG. 3, minor dendrite formation appears on the perimeter of the anode that is in contact with the solid electrolyte. FIG. 4 shows severe dendrite formation on the anode edge. As is apparent, the dendrite had advanced towards the edge (about 1 to 1.5 mm from the edge) of the cathode. The edge is at the interface of cross-hatched white surface (graph paper) and black surface.

By employing the mask(s) along the perimeter of the anode and/or cathode, the current density along the perimeter is reduced although the current density in the middle regions of the anode and cathode is increased proportionally. The overall effect is to increase the cycle life of the electrolytic cell by reducing dendrite formation.

As described previously, inventive mask(s) may be formed on the anode and/or cathode. When the dimensions of the anode are smaller than those of the cathode (and solid electrolyte), then it is preferred that the mask, when only one is employed, be formed on the cathode. One reason for this preference is that, if the mask were formed on the perimeter of the anode, some solid electrolyte will protrude onto the unmasked sides of the anode when the solid electrolyte is pressed against the anode. This effectively provides a path for dendrites, produced at the unmasked side anode, to circumvent the mask and reach the cathode. Protrusion of the solid electrolyte on the sides of the anode reduces the effectiveness of the mask on the anode. Positioning the mask on the cathode eliminates the problem.

Masks are preferably fabricated from radiation curable materials but they can also be fabricated from thermoplastics that are applied onto the anode and/or cathode. The dimensions of the masks made from thermoplastics are approximately the same as for masks fabricated from radiation curable materials. Using thermoplastics may require a longer processing time than when using radiation curable materials.

METHODOLOGY

A preferred method of fabricating an electrochemical cell is described herein. In addition, methods for preparing solid electrochemical cells and batteries are described in the art, for example, in U.S. Pat. Nos. 5,300,373, 5,316,556, 5,346,385, 5,262,253 and U.S. patent application Ser. Nos. 07/918,509 filed Jul. 22, 1992; 08/049,212, filed Apr. 19, 1993, which are all incorporated herein in their entirety.

In one preferred embodiment, the cathode is prepared from a cathode paste which comprises from about 35 to 65 weight percent of a compatible cathodic material; from about 1 to 20 weight percent of an electroconductive agent; from about 0 to 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a sold matrix forming monomer or partial polymer thereof. Also included is an ion conducting amount of an inorganic ion salt. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt present depends on the type of salt and electrolytic solvent employed.

The electrolyte composition typically comprises from 0 to about 80 weight percent electrolyte solvent (e.g., organic carbonate/glyme mixture) based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

The following Example illustrates a method of how an electrolytic cell could be fabricated.

In this embodiment, the solid electrolytic cell employs an intercalation based carbon anode instead of a lithium metal anode. With intercalation based carbon anodes, dendrite formation is not expected to be a major problem. In this instance, the mask serves primarily as a barrier to prevent adjacent electrodes from coming into physical contact and causing a short-circuit. The mask also prevents burrs emanating from a metal substrate from penetrating the electrolyte.

EXAMPLE

A solid electrolytic cell is prepared by first preparing a cathodic slurry which is spread onto a current collector. An electrolyte solution is then placed onto the cathode surface and the cathode slurry and electrolyte solution are simultaneously cured to provide for the solid electrolyte composition. Similarly, an anode composition is placed on a current collector and then an electrolytic solution is placed onto the anode composition and both are cured to form a solid electrolytic composition. A masking composition comprising 72% hexane diol diacrylate (Sanomer SR 344), 26% urethane diacrylate (Henkel Photomer 6140) and 2% photoinitiator (Ciba-Geigy Darcur 1173) can be used. The mixture is then painted on the edges of the anode surface and subsequently cross-linked by exposing it to ultraviolet light. After the mask is fabricated, the anode and cathode are laminated so that the solid electrolyte composition is situated therebetween to provide for a solid electrolytic cell. The specifics of this construction are as follows:

A. The Cathode Current Collector

The cathode current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween. The aluminum foil is preferably an alloy that is identified by either the industry specifications 1235-H19 (99.35% min. Al), or 1145-H19 (99.45% min. Al), and which is available from All Foils, Inc., Brooklyn Heights, Ohio. (Alternatively, aluminum mesh can be used as the current collector.)

The adhesion promoter layer is prepared as a dispersed colloidal solution in one of two methods. The first preparation of this colloidal solution for this example is as follows:

8.44 parts by weight of carbon powder (Shawinigan Black™—available from Chevron Chemical Company, San Ramon, Calif.)

33.76 parts by weight of a 25 weight percent solution of polyacrylic acid (a reported average molecular weight of about 90,000, commercially available from Aldrich Chemical Company—contains about 84.4 grams polyacrylic acid and 253.2 grams water)

57.80 parts by weight of isopropanol

In a preferred embodiment of the first method, an additional amount of water, e.g., 2–3 weight percent water based on the total weight of the colloidal solution, is incorporated to enhance coatability. Also, about 1 weight percent methyl ethyl ketone is added to the composition to enhance wettability of the aluminum.

The carbon powder and isopropanol are combined with mixing in a conventional high shear colloid mill mixer (Ebenbach-type colloid mill) until the carbon is uniformly dispersed and the carbon particle size is smaller than 10 μm. At this point, the 25 weight percent solution of polyacrylic acid is added to the mixer and further mixed for approximately 15 minutes. The resulting mixture is pumped to the coating head and applied by a reverse Gravure roller onto a sheet of aluminum foil about 9 in. (22.86 cm) wide and about 0.0005 in. (0.00127 cm) to about 0.001 in. (0.00254 cm) thick. After application, the solvent is evaporated by placing the mixture/foil into a conventional oven. After evaporation, an electrically-conducting adhesion-promoter layer of about 4–6 μm in thickness is formed. The aluminum foil is then cut to about 8 in. (20.32 cm) wide by removing approximately ½ in. (1.27 cm) from the sides with a conventional slitter so as to remove any uneven edges; the foil can then be further cut to the desired size.

The second preparation of this colloidal solution comprises mixing 25 lbs (11.35 kg) of carbon powder (Shawinigan Black™) with 100 lbs (45.4 kg) of a 25 weight percent solution of polyacrylic acid (average molecular weight of about 240,000, commercially available from B F Goodrich, Cleveland, Ohio, as Good-Rite K702 contains about 25 lbs (11.35 kg) polyacrylic acid and 75 lbs (34.05 kg) water) and with 18.5 lbs (8.399 kg) of isopropanol. Stirring is done in a 30 gallon (113.55 liters) polyethylene drum with a gear-motor mixer (e.g., Lighting Labmaster Mixer, model XJ-43, available from Cole-Parmer Instruments Co., Niles, Ill.) at 720 rpm with two 5 in. (12.7 cm) diameter A310-type propellers mounted on a single shaft. This wets down the carbon and eliminates any further dust problem. The resulting weight of the mixture is 143.5 lbs (65.149 kg) and contains some "lumps."

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 μm with the occasional 12.5 μm particles. The mixture can be stored for well over 1 month without the carbon settling out or reagglomerating.

When this composition is to be used to coat the current collector, an additional 55.5 lbs (25.197 kg) of isopropanol is mixed into the composition working with 5 gallon (18.925 l) batches in a plastic pail using an air powered shaft mixer (Dayton model 42231 available from Granger Supply Co., San Jose, Calif.) with a 4 in. (10.16 cm) diameter Jiffy-Mixer brand impeller (such as an impeller available as Catalog No. G-04541-20 from Cole Parmer Instrument Co., Niles, Ill.). Then, it is gear pumped through a 25 µm cloth filter (e.g., So-Clean Filter Systems, American Felt and Filter Company, Newburgh, N.Y.) and coated as described above.

B. The Cathode

The cathode is prepared from a cathodic slurry which, in turn, is prepared from a cathode powder as follows:

i. Cathode Powder

The cathode powder is prepared by combining 94.1±1.1 weight percent $LiMn_2O_4$ and 5.9±1.1 weight percent of carbon (Shawinigan Black™). About 100 grams of the resulting mixture is placed into a grinding machine (Attritor Model S-1 available from Union Process, Akron, Ohio) and ground for 30 minutes at 150 rpm. Afterwards, the resulting mixture is passed through a 200 mesh screen and then vacuum dried at 60° C. to produce a cathode powder with a water content of less than about 1000 ppm and preferably less than about 300 ppm.

ii. Cathode Slurry

A cathode slurry is prepared by combining sufficient cathode powder to provide for a final product having about 51.7 weight percent $LiMn_2O_4$. The slurry contains the following (in approximate weight percent):

| | |
|---|---|
| $LiMn_2O_4$ | 51.744% |
| Carbon | 6.456% |
| EPDM (ethylene propylene diene monomer) | 1.8% |
| Xylene | 40.0% |
| | 100% |

The method of preparing 100 grams of the cathode slurry is as follows:

1.8 grams of EPDM (Mooney viscosity of 26±5 and available as VISTALON™ 2504 (Exxon Chemical Co., Houston, Tex.) are mixed with 16.2 grams of xylene to form a 10.0% (wt.) EPDM solution. The temperature is maintained at between 40°–45° C. as the EPDM is added to the xylene. The solution is preferably filtered through a 20 micron filter cartridge.

An amount of carbon powder sufficient to provide 51.744 grams of $LiMn_2O_4$ per 100 grams of cathode slurry and a sufficient amount of carbon (Shawinigan Black™) to provide 6.456 grams of total carbon per 100 grams of slurry are mixed in a double planetary mixer where the blend is stirred at 7.5 Hz and 25° C. The above EPDM-xylene solution is passed through 4A molecular sieves and then added to the $LiMn_2O_4$ and carbon blend under vacuum mixing over a 5 minute period during which time an additional 23.8 grams of xylene are added. Afterwards, the mixing speed is increased from 7.5 to 20 Hz and maintained for another 5 minutes. Thereafter, the temperature of the mixture is gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45° C. over about a 30 minute period. Finally, the mixture is mixed for 5 minutes at this temperature.

The extruded cathode slurry is then coated to a substantially uniform thickness of about 25–200 µm, more preferably 50–100 µm, and most preferably about 100 µm, over the current collector by a doctor blade, Meyer-rod, or by reverse roll coating. The cathode slurry/current collector is heated to remove the xylene.

C. Electrolyte 36.26 grams of propylene carbonate, 3.45 grams of trimethyl propyl triacrylate, 36.26 grams of ethylene carbonate, and 13.79 grams of urethane acrylate (Actilane SP023, available from Akros Chemicals, Ltd., Manchester, England) are combined at room temperature until homogeneous. The resulting solution is optionally passed through a column of 4A molecular sieves to remove water and then the recovered solution is mixed at room temperature until homogeneous. If necessary, the ethylene carbonate can first be dissolved in propylene carbonate with heat.

At this point, 1.47 grams of polyethylene oxide film forming agent having a number average molecular weight of about 600,000 (available as Polyox WSR-205 from Union Carbide Chemicals and Plastics, Danbury, Conn.) is added to the above solution and then dispersed while stirring with a magnetic stirrer over a period of about 60–120 minutes. After dispersion, the solution is heated to between 60° and 65° C. with stirring until the film forming agent is dissolved. A thermocouple is placed at the edge of the vortex created by the magnetic stirrer to monitor solution temperature. The solution is cooled to a temperature of less than 48° C. and then 8.77 grams of $LiPF_6$ are added to the solution over a 120 minute period while thoroughly mixing to ensure a substantially uniform temperature profile throughout the solution. Cooling is applied as necessary to maintain the temperature of the solution at less than 48° C.

In one optional embodiment, the polyethylene oxide film forming agent is added to the solution via a mini-sieve, such as a 25 mesh mini-sieve that is commercially available as Order No. 57333-965 from VWR Scientific, San Francisco, Calif.

The resulting solution contains the following in approximate weight percent based on the total weight of the electrolyte solution (100 g):

| | |
|---|---|
| Propylene Carbonate | 36.26% |
| Ethylene Carbonate | 36.26% |
| Trimethylol propyl triacrylate (TMPTA) | 3.45% |
| Urethane-acrylate | 13.79% |
| $LiPF_6$ | 8.77% |
| PEO Film Forming Agent | 1.47% |
| Total | 100.00% |

This solution is then degassed to provide for an electrolyte solution wherein little, if any, of the $LiPF_6$ salt decomposes.

Optionally, the above solution which contains the prepolymer, the film forming agent, the electrolytic solvent and the $LiPF_6$ salt, is filtered to remove any solid particles or gels remaining in the solution. One suitable filter device is a sintered stainless steel screen having a pore size between 1 and 50 µm at 100% efficiency.

In an alternative embodiment, the electrolyte is prepared by the following steps using the same above described electrolyte components:

1. Check the moisture level of the urethane acrylate. If the moisture level is less than 100 ppm water, proceed to step 2. If not, then first dissolve the urethane acrylate at room temperature, <30° C., in the propylene carbonate and ethylene carbonate and dry the solution over 4A molecular sieves (Grade 514, 8–12 Mesh from Schoofs Inc., Moraga, Calif.) and then proceed to step 4.

2. Dry the propylene carbonate and ethylene carbonate over 4A molecular sieves (Grade 514, 8–12 Mesh from Schoofs Inc., Moraga, Calif.).

3. At room temperature, <30° C., add the urethane acrylate to the solvent prepared in step 2. Stir until the resin is completely dissolved. The solution should be clear and colorless.

4. Dry and optionally sift the polyethylene oxide film forming agent through a 25 mesh mini-sieve commercially available as Order No. 57333-965 from VWR Scientific, San Francisco, Calif. While stirring add the dried and pre-sifted polyethylene oxide film forming agent slowly to the solution. The polyethylene oxide film forming agent should be sifted into the center of the vortex formed by the stirring means at a controlled rate to avoid agglomerate formation. Addition of the polyethylene oxide film forming agent should be dispersive and, during addition, the temperature should be maintained at room temperature (<30° C.).

5. After final addition of the polyethylene oxide film forming agent, stir to ensure that the film forming agent is substantially dispersed.

6. Heat the mixture to 68° to 75° C. and stir until the film forming agent has melted and the solution has become transparent. Optionally, in this step, the mixture is heated to 65° to 68° C.

7. Cool the solution produced in step 6 and when the temperature of the solution reaches 40° C., add the $LiPF_6$ salt very slowly making sure that the maximum temperature does not exceed 55° C. and preferably does not exceed about 40° C.

8. Thereafter, the solution is stirred and degassed. The electrolyte solution is allowed to cool before usage.

9. Optionally, filter the solution through a sintered stainless steel screen having a pore size between 1 and 50 μm at 100% efficiency.

At all times, the temperature of the solution should be monitored with a thermocouple which should be placed in the vortex formed by the mixer.

Afterwards, the electrolyte mixture is coated by a slot die coater or a reverse roll flexographic coater to a thickness of about 25–50 μm onto the surface of the dried cathode slurry described above.

D. The Anode Current Collector

The anode current collector employed is a sheet of copper foil, about 0.33 mils (8.5 μm) to 0.5 mils (12.7 μm) thick, having a layer of adhesion promoter attached to the surface of the foil which will contact the anode so as to form a composite having a sheet of copper foil, an anode and a layer of adhesion promoter interposed therebetween. (Alternatively, copper mesh can be used as the current collector.)

The same adhesion promoter composition used with the cathode is employed with the anode.

E. The Anode

The anode is prepared from an anodic slurry which, in turn, is prepared from an anode powder as follows:

i. Anode Powder

The anode powder is prepared by combining about 93.81 weight percent of Mitsubishi Gas Carbon™ (a coke-like material) (Mitsubishi Petroleum Co. Ltd, Tokyo, Japan) and about 6.19 weight percent of carbon (Shawinigan Black™). About 100 grams of the resulting mixture is placed into a grinding machine (Attritor Model S-1) and ground for 30 minutes at 150 rpm Afterwards, the resulting mixture is passed through a 200 mesh screen and then vacuum dried at 60° C. to produce an anode powder with a water content of less than about 1000 ppm and preferably less than about 300 ppm.

ii. Anode Slurry

An anode slurry is prepared by combining sufficient anode powder to provide for a final product having about 54.6 weight percent of the Mitsubishi Gas Carbon. The slurry contains the following (in approximate weight percent):

| Mitsubishi Gas Carbon | 54.6% |
|---|---|
| Carbon | 3.6% |
| EPDM (ethylene propylene diene monomer) | 1.8% |
| Xylene | 40.0% |
| | 100% |

The method of preparing 100 grams of the anode slurry is as follows:

1.8 grams of EPDM (VISTALON™ 2504) are mixed in 16.2 grams of xylene to form a 10.0% (wt.) EPDM solution. The temperature is maintained at between 40°–45° C. as the EPDM is added to the xylene. The solution is preferably filtered through a 20 micron filter cartridge.

An amount of anode powder sufficient to provide 54.6 grams of Mitsubishi Gas Carbon per 100 grams of anode slurry and a sufficient amount of carbon (Shawinigan Black™) to provide 3.6 grams of total carbon per 100 grams of slurry are mixed in a double planetary mixer where the blend is stirred at 7.5 Hz and 25° C. The above EPDM-xylene solution is passed through 4A molecular sieves and then added to the Gas Carbon and carbon blend under vacuum mixing over a 5 minute period during which time an additional 23.8 grams of xylene are added. Afterwards, the mixing speed is increased from 7.5 to 20 Hz and maintained for another 5 minutes. Thereafter, the temperature of the mixture is gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45° C. over about a 30 minute period. Finally, the mixture is mixed for 5 minutes at this temperature.

The so-prepared anode slurry can be placed onto the adhesion layer of the current collector by coating a layer of the slurry having a substantially uniform thickness of about 25–200 μm, more preferably 50–100 μm, and most preferably about 50 μm, over the current collector by a doctor blade, Meyer-rod, or by reverse roll coating. The anode slurry/current collector is then heated to remove the xylene.

Afterwards, an electrolyte mixture is coated by a slot die coater or a reverse roll flexographic coater to a thickness of about 25–50 μm onto the surface of the dried anode slurry described above.

F. The Solid Electrolytic Cell

A sheet comprising a solid battery is prepared by laminating the electrolyte/anode composite with the electrolyte/cathode composite so that the electrolyte is positioned between the anode and cathode. Lamination is accomplished by minimal pressure.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A solid secondary electrolytic cell which comprises:

an anode;

a cathode;

a solid electrolyte functionally disposed between said anode and said cathode; and a mask comprising an electrically insulative layer that is coated on a surface along the perimeter of said anode, cathode, or solid electrolyte, wherein the mask is fabricated by a process comprising:

(i) depositing a liquid radiation curable material onto said surface; and (ii) curing said radiation curable material wherein the mask is interposed between the solid electrolyte and the anode or the cathode.

2. The solid, secondary electrolytic cell of claim 1 wherein the mask is coated on the perimeter of said anode.

3. The solid, secondary electrolytic cell of claim 2 wherein the length and width of the anode are less than those of the cathode.

4. The solid, secondary electrolytic cell of claim 1 wherein the mask is coated on the perimeter of said cathode.

5. The solid, secondary electrolytic cell of claim 1 wherein said radiation curable material comprises acrylates.

6. The solid, secondary electrolytic cell of claim 1 wherein said mask has a thickness of about 1 µm to about 25 µm.

7. The solid, secondary electrolytic cell of claim 1 wherein the anode comprises metallic lithium.

8. The solid, secondary electrolytic cell of claim 1 wherein the mask is substantially impermeable to electrolytic solvents and salts.

9. The solid, secondary electrolytic cell of claim 1 wherein the mask has a depth on each side that is about 0.5 to 10% of the anode, cathode, or solid electrolyte surface dimensions.

10. The solid, secondary electrolytic cell of claim 1 wherein the anode comprises intercalation carbon materials.

11. The solid, secondary electrolytic cell of claim 1 wherein the mask prevents physical contact of the anode and cathode.

12. The solid, secondary electrolytic cell of claim 1 wherein the mask covers the entire perimeter of the anode, cathode, or electrolyte surface.

13. A solid secondary electrolytic cell which comprises:

an anode;

a cathode;

a solid electrolyte functionally disposed between said anode and said cathode; and two masks each comprising an electrically insulative layer that is coated on a surface along the perimeter of said anode, cathode, or solid electrolyte, wherein each mask is fabricated by a process comprising:

(i) depositing a liquid radiation curable material onto said surface; and (ii) curing said radiation curable material wherein one mask is interposed between the anode and solid electrolyte and the second mask is interposed between the cathode and solid electrolyte.

14. The solid, secondary electrolytic cell of claim 13 wherein one mask is coated on the perimeter of said anode and a second mask is coated on the perimeter of said cathode.

15. The solid, secondary electrolytic cell of claim 14 wherein the length and width of the anode are less than those of the cathode.

16. The solid, secondary electrolytic cell of claim 13 wherein said radiation curable material comprises acrylates.

17. The solid, secondary electrolytic cell of claim 13 wherein each mask has a thickness of about 1 µm to about 25 µm.

18. The solid, secondary electrolytic cell of claim 13 wherein each mask is substantially impermeable to electrolytic solvents and salts.

19. The solid, secondary electrolytic cell of claim 13 wherein each mask has a depth on each side that is about 0.5 to 10% of the anode, cathode, or solid electrolyte surface dimensions.

20. The solid, secondary electrolytic cell of claim 13 wherein the anode comprises intercalation carbon materials.

21. The solid, secondary electrolytic cell of claim 13 wherein each mask prevents physical contact of the anode and cathode.

22. The solid, secondary electrolytic cell of claim 13 wherein the masks cover the entire perimeter of the anode, cathode, or electrolyte surface.

23. A solid secondary electrolytic cell which comprises:

an anode;

a cathode;

a solid electrolyte functionally disposed between said anode and said cathode; and a mask comprising an electrically insulative layer that is positioned on a surface along the perimeter of said anode, cathode, or solid electrolyte, wherein the mask comprises a radiation cured material and wherein the mask is interposed between the solid electrolyte and anode or the cathode.

24. The solid, secondary electrolytic cell of claim 23 wherein the length and width of the anode are less than those of the cathode.

25. The solid, secondary electrolytic cell of claim 23 wherein the mask is substantially impermeable to electrolytic solvents and salts.

26. The solid, secondary electrolytic cell of claim 23 wherein the mask has a depth on each side that is about 0.5 to 10% of the anode, cathode, or solid electrolyte surface dimensions.

27. The solid, secondary electrolytic cell of claim 23 wherein the anode comprises intercalation carbon materials.

28. The solid, secondary electrolytic cell of claim 23 wherein the mask prevents physical contact of the anode and cathode.

29. The solid, secondary electrolytic cell of claim 23 wherein the anode comprises intercalation carbon material.

30. The solid, secondary electrolytic cell of claim 23 wherein the mask covers the entire perimeter of the anode, cathode or electrolyte surface.

31. The solid, secondary electrolytic cell of claim 23 wherein the mask has a thickness of about 1 µm to about 25 µm.

* * * * *